US012771639B2

(12) United States Patent
Wang et al.

(10) Patent No.: US 12,771,639 B2
(45) Date of Patent: Oct. 20, 2026

(54) PACKET TRANSMISSION METHOD AND APPARATUS, AND DEVICE

(71) Applicant: NEW H3C TECHNOLOGIES CO., LTD., Zhejiang (CN)

(72) Inventors: Minghui Wang, Beijing (CN); Jiangxuan Xie, Beijing (CN)

(73) Assignee: New H3C Technologies Co., Ltd., Zhejiang (CN)

( * ) Notice: Subject to any disclaimer, the term of this patent is extended or adjusted under 35 U.S.C. 154(b) by 1 day.

(21) Appl. No.: 19/133,321

(22) PCT Filed: Mar. 28, 2023

(86) PCT No.: PCT/CN2023/084539

§ 371 (c)(1),
(2) Date: May 28, 2025

(87) PCT Pub. No.: WO2024/197613

PCT Pub. Date: Oct. 3, 2024

(65) Prior Publication Data

US 2026/0081867 A1 Mar. 19, 2026

(51) Int. Cl.
*H04L 47/12* (2022.01)

(52) U.S. Cl.
CPC .................................... *H04L 47/12* (2013.01)

(58) Field of Classification Search
CPC ....... H04L 47/12; H04L 47/115; H04L 47/25; H04L 47/26
See application file for complete search history.

(56) References Cited

U.S. PATENT DOCUMENTS 11,991,246 B2 * 5/2024 Shilimkar ........... H04L 47/2408
2020/0236052 A1 7/2020 Srinivasan et al.

(Continued)

FOREIGN PATENT DOCUMENTS

CN 108270691 A 7/2018
CN 109981471 A 7/2019

(Continued)

OTHER PUBLICATIONS

International Search Report issued in WIPO Patent Application No. PCT/CN2023/084539, dated Sep. 20, 2023, along with an English translation thereof.

(Continued)

*Primary Examiner* — Nazia Naoreen
(74) *Attorney, Agent, or Firm* — GREENBLUM & BERNSTEIN, P.L.C.

(57) ABSTRACT

A packet transmission method includes: obtaining a target rate limitation policy and a target explicit congestion notification (ECN) parameter corresponding to the target port; when transmitting specified-type data in a target priority queue corresponding to the target port to a destination device, adding a congestion mark to the specified-type data based on the target ECN parameter, wherein the congestion mark is configured to allow the destination device to transmit first-class congestion notification packets (CNPs) to a source device; based on the target rate limitation policy, performing rate limitation on the first-class CNPs, and transmitting the first-class CNPs remaining after rate limitation to the source device; determining a target packet rate; and based on the target packet rate, generating second-class CNPs, and transmitting the second-class CNPs to the source device.

14 Claims, 4 Drawing Sheets

(56) References Cited

U.S. PATENT DOCUMENTS

| | | | |
|---|---|---|---|
| 2020/0396170 | A1 | 12/2020 | Gafni et al. |
| 2021/0152484 | A1 | 5/2021 | Shpigelman et al. |
| 2022/0311711 | A1 | 9/2022 | Jepsen et al. |

FOREIGN PATENT DOCUMENTS

| | | | |
|---|---|---|---|
| CN | 113055935 | A | 6/2021 |
| CN | 113162862 | A | 7/2021 |
| CN | 114745331 | A | 7/2022 |
| CN | 115695314 | A | 2/2023 |
| CN | 116055416 | A | 5/2023 |
| WO | 2023/011179 | A1 | 2/2023 |

OTHER PUBLICATIONS

European Patent Office, Extended European Search Report Issued in Application No. 23929212.1, Dec. 17, 2025, Germany, 9 pages.

Zhong Xiaolong et al: "PACC: Proactive and Accurate Congestion Feedback for RDMA Congestion Control" IEEE INFOCOM 2022—IEEE Conference on Computer Communications, IEEE, May 2, 2022, 10 pages.

ISA State Intellectual Property Office of the People's Republic of China, Written Opinion of the International Searching Authority Issued in Application No. PCT/CN2023/084539, Sep. 20, 2023, WIPO, 6 pages.

Huawei, "CloudEngine 9800, 8800, 6800, and 5800 V200R020C10 Configuration Guide—Intelligent Lossless Network", Jun. 1, 2021, pp. 181.

* cited by examiner

PACKET TRANSMISSION METHOD AND APPARATUS, AND DEVICE

CROSS REFERENCE TO RELATED APPLICATIONS

This application is a National Phase of International Application No. PCT/CN2023/084539, filed on Mar. 28, 2023, the entire contents of which are incorporated herein by reference in their entireties.

TECHNICAL FIELD

The present disclosure relates to the field of communication technologies, and in particular to a packet transmission method and apparatus, and a device.

BACKGROUND

With increasing services of high concurrency and low delay, network congestion may tend to occur at an egress port of a network device (e.g., a switch or a router or the like). The network congestion refers to that when a flow received by the network device via an ingress port is far larger than a flow transmitted from the egress port, a large amount of data is stranded (cached) in an egress queue (a queue corresponding to the egress port). This may affect the network performances such as data transmission delay and throughput and the like.

In order to solve the network congestion, the network device may, when forwarding data to a destination device, add a congestion mark to the data, and the destination device may, after receiving the data with the congestion mark, transmit a congestion notification packet (CNP) to a source device. After the source device receives the CNP, the source device lowers a data transmission rate to reduce the flow received by the network device via the ingress port, so as to solve the network congestion.

However, in a long-distance optical fiber scenario, since a distance between the source device and the destination device is large, the network link delay is large, namely, the transmission time of the CNP is long. In this case, the source device cannot lower the data transmission rate in time, which deteriorates the data transmission performance of the network device. For example, the network device receives a huge amount of data within a period of time, leading to network congestion; within another period of time, the network device receives a small amount of data, such that the bandwidth resource of the egress port cannot be fully utilized. The above process is repeated, leading to poor data transmission performance.

SUMMARY

The present disclosure provides a packet transmission method, which is applied to a network device. The network device includes a target port connected to another device via a long-distance optical fiber. The method includes:

obtaining a target rate limitation policy and a target explicit congestion notification (ECN) parameter corresponding to the target port;

when transmitting specified-type data in a target priority queue corresponding to the target port to a destination device, adding a congestion mark to the specified-type data based on the target ECN parameter, where the congestion mark is configured to allow the destination device to transmit first-class congestion notification packets (CNPs) to a source device;

based on the target rate limitation policy, performing rate limitation on the first-class CNPs received by the target port, and transmitting the first-class CNPs remaining after rate limitation to the source device;

based on a first transmission rate of the specified-type data added with the congestion mark and a second transmission rate of the first-class CNPs forwarded to the source device, determining a target packet rate; and based on the target packet rate, generating second-class CNPs, and transmitting the second-class CNPs to the source device, where the second-class CNPs are configured to control the source device to lower the transmission rate of the specified-type data.

The present disclosure provides a network device, including a processor; and a non-transitory machine readable storage medium storing machine executable instructions executable by the processor, where the processor is configured to, when executing the machine executable instructions, perform the method as mentioned above.

It can be seen from the above technical solutions that, in the embodiments of the present disclosure, in a long-distance optical fiber scenario, rate limitation may be performed on the CNPs received by the target port to avoid a large number of CNPs received by the source device within a short period of time. Thus, the CNPs received by the source device are relatively balanced and smooth, and the rate reduction process of the source device (the process of lowering the data transmission rate) is smoother and hence the case that the source device lowers the rate greatly within a period of time but lowers the rate little or does not lower the rate at all within another period of time can be avoided. In this case, the network device has good data transmission performance, and thus the case that the network device receives a large amount of data within a period of time, leading to network congestion, but receives a small amount of data within another period of time, leading to failure to fully use the bandwidth resource, can be avoided. Furthermore, based on the transmission rate of the specified-type data added with the congestion mark and the transmission rate of the first-class CNPs forwarded to the source device, the target packet rate can be determined, and then, the second-class CNPs can be generated based on the target packet rate, and transmitted to the source device. In this way, the network device can transmit supplementary CNPs to further mitigate the influence of the long-distance optical fiber, and thus better control the transmission rate of the source device for the specified-type data, achieving better control effect.

BRIEF DESCRIPTION OF THE DRAWINGS

To describe the technical solutions in the embodiments of the present disclosure or in the prior art more clearly, drawings required in descriptions of the embodiments of the present disclosure or the prior art will be briefly introduced below. It is apparent that the drawings described below are merely some embodiments of the present disclosure and other drawings may be obtained by those of ordinary skill in the prior art based on these drawings in the examples of the present disclosure.

DETAILED DESCRIPTION OF THE EMBODIMENTS

The terms used in the embodiments of the present disclosure are for the purpose of describing a particular embodiment only, and are not intended to be limiting of the present disclosure. The singular forms such as "a", "said", and "the" used in the present disclosure and the appended claims are also intended to include multiple, unless the context clearly indicates otherwise. It is also to be understood that the term "and/or" as used herein refers to and includes any or all possible combinations of one or more associated listed items.

It is to be understood that, although the terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, the second information may also be referred as the first information. Depending on the context, the term "if" as used herein may be interpreted as "when" or "upon" or "in response to determining".

Figure 1:
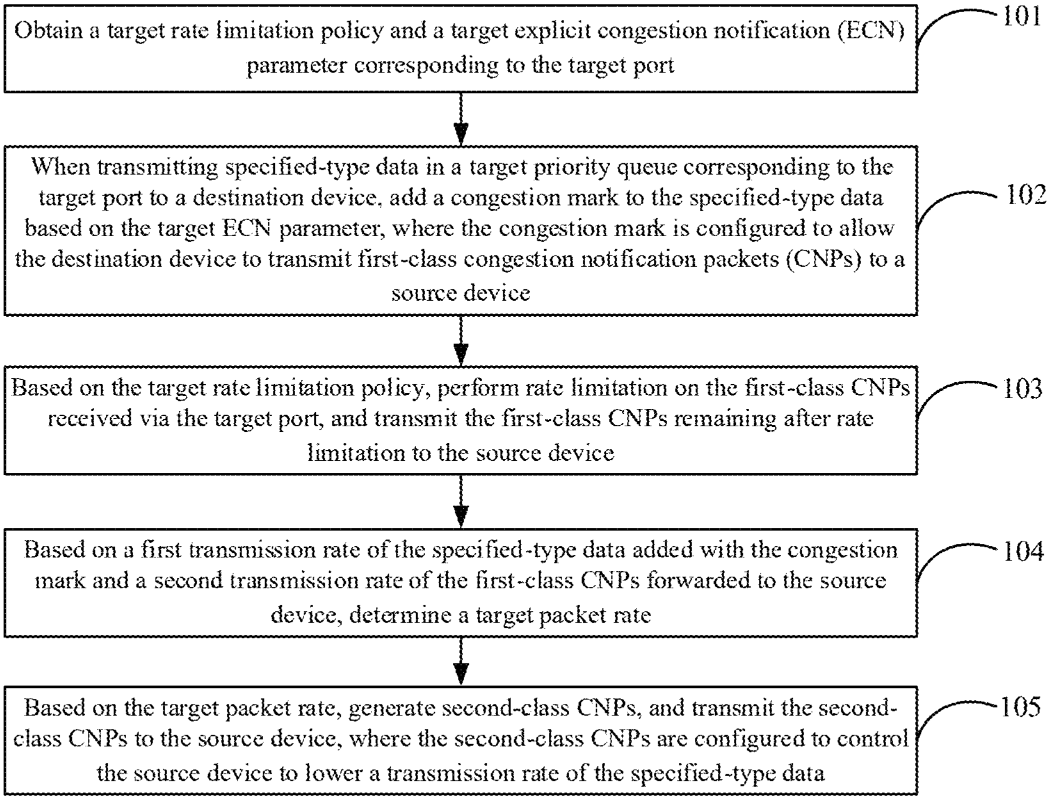
FIG. 1 is a flowchart illustrating a packet transmission method according to an embodiment of the present disclosure.

An embodiment of the present disclosure provides a packet transmission method, which is applied to a network device (e.g., a router or a switch or the like). The network device includes a target port connected to another device via a long-distance optical fiber. As shown in FIG. 1, it is a flowchart of the method. The method includes the following steps 101 to 105.

At step 101, a target rate limitation policy and a target explicit congestion notification (ECN) parameter corresponding to the target port are obtained.

At step 102, when specified-type data in a target priority queue corresponding to the target port is transmitted to a destination device, a congestion mark is added to the specified-type data based on the target ECN parameter, where the congestion mark is configured to allow the destination device to transmit first-class congestion notification packets (CNPs) to a source device.

At step 103, based on the target rate limitation policy, rate limitation is performed on the first-class CNPs received by the target port, and the first-class CNPs remaining after rate limitation are transmitted to the source device.

At step 104, based on a first transmission rate of the specified-type data added with the congestion mark and a second transmission rate of the first-class CNPs forwarded to the source device, a target packet rate is determined.

At step 105, second-class CNPs are generated based on the target packet rate and transmitted to the source device, where the second-class CNPs are configured to control the source device to lower the transmission rate of the specified-type data.

Illustratively, based on the first transmission rate of the specified-type data added with the congestion mark and the second transmission rate of the first-class CNPs forwarded to the source device, determining the target packet rate may include but not limited to: calculating a first amount of the specified-type data added with the congestion mark within a target period of time, and calculating a second amount of the first-class CNPs forwarded to the source device within the target period of time; based on the first amount and a time length of the target period of time, determining the first transmission rate; based on the second amount and the time length of the target period of time, determining the second transmission rate; based on the first transmission rate and the second transmission rate, determining the target packet rate.

Illustratively, based on the first transmission rate of the specified-type data added with the congestion mark and the second transmission rate of the first-class CNPs forwarded to the source device, determining the target packet rate may include but not limited to: based on the first transmission rate and the second transmission rate, determining a candidate packet rate, where the candidate packet rate is a minimum value in the first transmission rate and the second transmission rate; then, based on a difference between the first transmission rate and the candidate packet rate, determining the target packet rate.

Illustratively, based on the target packet rate, generating the second-class CNPs, and transmitting the second-class CNPs to the source device may include but not limited to: generating a target number of second-class CNPs matching the target packet rate; if the target priority queue includes a data flow corresponding to at least one source device, for each source device, based on a rate of the data flow corresponding to the source device, determining a rate ratio corresponding to the source device; based on the target number and the rate ratio corresponding to the source device, determining a packet number corresponding to the source device, and transmitting the packet number of second-class CNPs to the source device.

Illustratively, obtaining the target rate limitation policy corresponding to the target port may include but not limited to: based on flow scenario data corresponding to the target port, determining a target scenario model parameter, where the target scenario model parameter at least includes an optical fiber length corresponding to the long-distance optical fiber; based on a mapping table, querying for a target rate limitation policy corresponding to the target scenario model parameter; where the mapping table includes a correspondence between scenario model parameter and rate limitation policy, and the rate limitation policy is configured to allow the target port to have an optimal data transmission performance under the scenario model parameter.

Illustratively, before the target rate limitation policy corresponding to the target scenario model parameter is queried for based on the mapping table, the method may further include a process of establishing the mapping table. Specifically, in a process of establishing the mapping table, based on flow scenario data corresponding to the target port under a test environment, a scenario model parameter is determined, and a plurality of rate limitation policies corresponding to the scenario model parameter are obtained. Then, for each rate limitation policy, based on the rate limitation policy, rate limitation is performed on the CNPs received by the target port and the data transmission performance corresponding to the target port after rate limitation is calculated. Based on the data transmission performance corresponding to each rate limitation policy, a correspondence between the scenario model parameter and the rate limitation policy corresponding to the optimal data transmission performance is recorded in the mapping table.

Illustratively, the target port corresponds to a plurality of priority queues and the plurality of priority queues include the target priority queue carrying the specified-type data. Calculating the data transmission performance corresponding to the target port after rate limitation may include but not limited to: calculating a queue average bandwidth corresponding to the target priority queue and calculating a round-trip delay corresponding to the specified-type data in the target priority queue; based on the queue average bandwidth and/or the round-trip delay, determining the data transmission performance corresponding to the target port after rate limitation; where the data transmission performance is in direct proportion with the queue average bandwidth, and the data transmission performance is in inverse proportion with the round-trip delay.

Illustratively, the target port corresponds to a plurality of priority queues and the plurality of priority queues include the target priority queue carrying the specified-type data. The target scenario model parameter may further include but not limited to at least one of: a device type of the network device, an egress port rate of a target port, a number of ingress ports corresponding to the specified-type data in the target priority queue, and a queue level of the target priority queue. For example, the queue level of the target priority queue may be determined based on the queue average bandwidth of the target priority queue and the queue average bandwidth of other priority queues than the target priority queue.

Illustratively, the network device may obtain a target explicit congestion notification (ECN) parameter corresponding to the target port. The target ECN parameter may include but not limited to: a target base water mark, a target high water mark, and a target mark probability. Based on the target ECN parameter, adding the congestion mark to the specified-type data may include but not limited to: if a queue length of the target priority queue is greater than the target base water mark but not greater than the target high water mark, adding the congestion mark to the specified-type data based on the target mark probability; if the queue length of the target priority queue is greater than the target high water mark, adding the congestion mark to the data of all specified types in the target priority queue.

Illustratively, the target rate limitation policy may include but not limited to a rate limitation value for the CNPs, where the rate limitation value represents a byte number of the CNPs permitted to run through per second or a packet number of the CNPs permitted to run through per second. The specified-type data may include, but is not limited to, RDMA over converged ethernet (ROCE) data.

It can be seen from the above technical solutions that, in the embodiments of the present disclosure, in a long-distance optical fiber scenario, rate limitation may be performed on the CNPs received by the target port to avoid a large number of CNPs received by the source device within a short period of time. Thus, the CNPs received by the source device are relatively balanced and smooth, and the rate reduction process of the source device (the process of lowering the data transmission rate) is smoother and hence the case that the source device lowers the rate greatly within a short period of time but lowers the rate little or does not lower the rate at all within another period of time can be avoided. In this case, the network device has good data transmission performance, and thus the case that the network device receives a large amount of data within a period of time, leading to network congestion, but receives a small amount of data within another period of time, leading to failure to fully use the bandwidth resource, can be avoided. Furthermore, based on the transmission rate of the specified-type data added with the congestion mark and the transmission rate of the first-class CNPs forwarded to the source device, the target packet rate can be determined, and then, the second-class CNPs can be generated based on the target packet rate, and transmitted to the source device. In this way, the network device can transmit supplementary CNPs to further mitigate the influence of the long-distance optical fiber, and thus better control the transmission rate of the source device for the specified-type data, achieving better control effect.

The packet transmission method of the embodiment of the present disclosure will be described below in combination with specific application scenarios.

Figure 2:
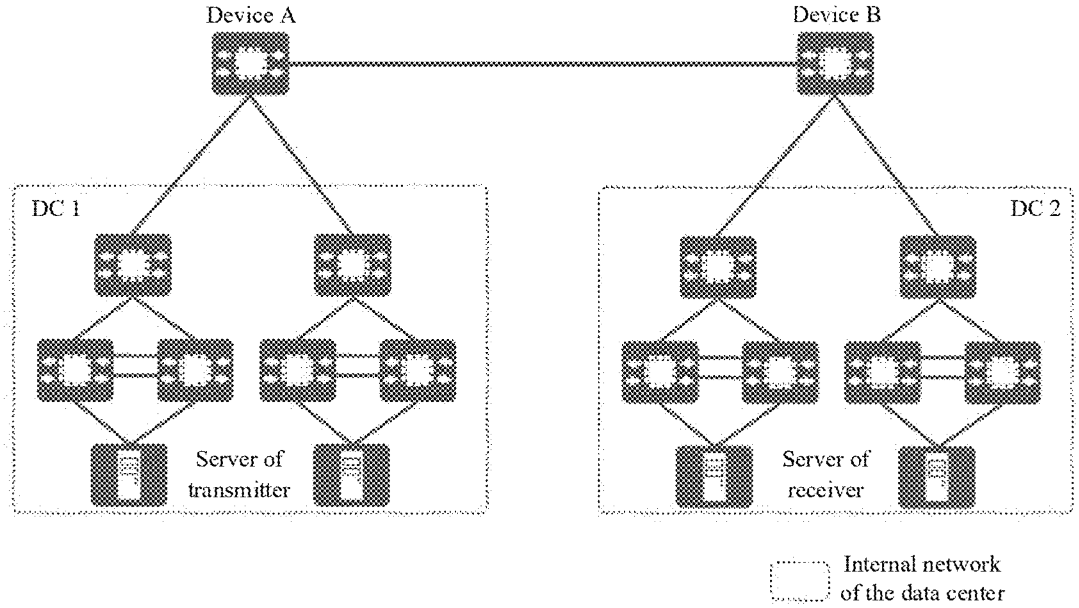
FIG. 2 is a schematic diagram illustrating an application scenario of a data center interconnection according to an embodiment of the present disclosure.

FIG. 2 is a schematic diagram illustrating an application scenario of a data center interconnection. When a server in a data center (DC1) transmits data to a server in a DC2, the server in the DC1 can be referred to as a server of transmitter (i.e., source device), and the server in the DC2 is referred to as a server of receiver (i.e., destination device). When the server in the DC2 transmits data to the server in the DC1, the server in the DC2 is referred to as a source device, and the server in the DC1 is referred to as a destination device. For ease of descriptions, in subsequent embodiments, the server in the DC1 is referred to as a source device and the server in the DC2 is referred to as a destination device.

There are a plurality of network devices (e.g., a router, a switch and the like) between the source device and the destination device, and the source device and the destination device are connected via a plurality of network devices. A device A and a device B are network devices between the source device and the destination device. The device A and the device B are used as egress devices in the data center interconnection. The device A is an egress device in the DC1 and the device B is an egress device in the DC2.

With increasing services of high concurrency and low delay, network congestion may tend to occur at an egress port of a network device. This may affect the network performances such as data transmission delay and throughput and the like. In order to guarantee the high performance of the data center, it is required to construct a lossless Ethernet to ensure no packet loss during network transmission. Therefore, it is necessary to solve the problem of the network congestion. In order to solve the problem of the network congestion, when the network device forwards data to the destination device, a congestion mark is added to the data. After receiving the data added with the congestion mark, the destination device transmits CNPs to the source device. After receiving the CNPs, the source device lowers a data transmission rate such that the flow received by the network device via the ingress port is smaller, so as to solve the network congestion problem. For example, when network congestion occurs to the egress port of the device A, the device A may transmit data carrying a congestion mark to the server of receiver (i.e., the destination device) in the DC2. The server of receiver in the DC2 then transmits CNPs to the server of transmitter (i.e., the source device) in the DC1. After receiving the CNPs, the server of transmitter in the DC1 may lower the data transmission rate, such that the flow received by the device A is smaller, so as to solve the network congestion.

In a long-distance optical fiber scenario, the distance between the source device and the destination device is very large, that is, the distance between the server of transmitter in the DC1 and the server of receiver in the DC2 is very large, and further, the network link delay is large, and thus the transmission time of the CNPs is relatively long. In this case, the source device is unable to lower the data transmission rate in time, such that the data transmission performance of the network device (e.g., the Device A and the Device B and the like) is poor.

For example, in a long-distance optical fiber scenario of data center interconnection, the length of the long-distance optical fiber may be up to dozens of kilometers or even one hundred kilometers. Although the transmission rate of the data over the long-distance optical fiber is fast, a long delay may be still present in this long-distance optical fiber scenario, for example, the delay may be a millisecond (ms)-level delay. In this case, the network link delay is large, leading to long transmission time of the CNPs. With the large delay of the CNPs, the source device cannot lower the data transmission rate in time, such that the data transmission performance of the network device is severely lowered.

Figure 3:
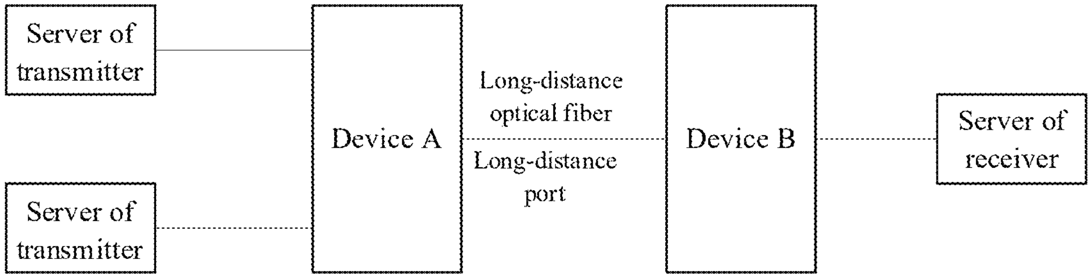
FIG. 3 is a schematic diagram illustrating a long-distance optical fiber scenario of a data center interconnection according to an embodiment of the present disclosure.

FIG. 3 is a schematic diagram illustrating a long-distance optical fiber scenario of a data center interconnection. This schematic diagram is a reduced graph of FIG. 2, where the server of transmitter is a source device, the server of receiver is a destination device, and the device A and the device B are network devices. The device A is connected with the device B via a long-distance port, and a long-distance optical fiber is present between the device A and the device B. In a test under the above network environment, if the long-distance optical fiber between the device A and the device B is 60 km, when the server of transmitter transmits data of 100 G rate to the server of receiver, in the case of enabling CNPs to solve the network congestion, it can be known from the test that the server of receiver can only receive a flow of 52 G. If the long-distance optical fiber between the device A and the device B is replaced with a short-distance optical fiber which may be, for example, several kilometers, when the server of transmitter transmits data of 100 G rate to the server of receiver, in the case of enabling CNPs to solve the network congestion, it can be known from the test that the server of receiver can receive a flow of more than 90 G. In conclusion, it can be seen that in the long-distance optical fiber scenario, the data transmission performance is poor, and the flow rate becomes smaller, for example, 52 G from close to 100 G (linear velocity) periodically.

For the above discovery, an embodiment of the present disclosure provides a packet transmission method, by which, in a long-distance optical fiber scenario, rate limitation may be performed on CNPs received by the target port to avoid a large number of CNPs received by the source device within a short period of time. In this case, the CNPs received by the source device may be relatively balanced and smooth, and the rate reduction process of the source device is smoother, and thus the data transmission performance of the network device is better.

The embodiments of the present disclosure involve a test process and an application process. In the test process, a correspondence between scenario model parameter and rate limitation policy may be obtained and then recorded in a mapping table A, and further, a correspondence between flow scenario parameter and ECN parameter may be obtained and then recorded in a mapping table B. In the application process, a target ECN parameter may be obtained based on the mapping table B and based on the target ECN parameter, data is sent; based on the mapping table A, a target rate limitation policy may be obtained and based on the target rate limitation policy, rate limitation is performed on the CNPs.

Figure 4:
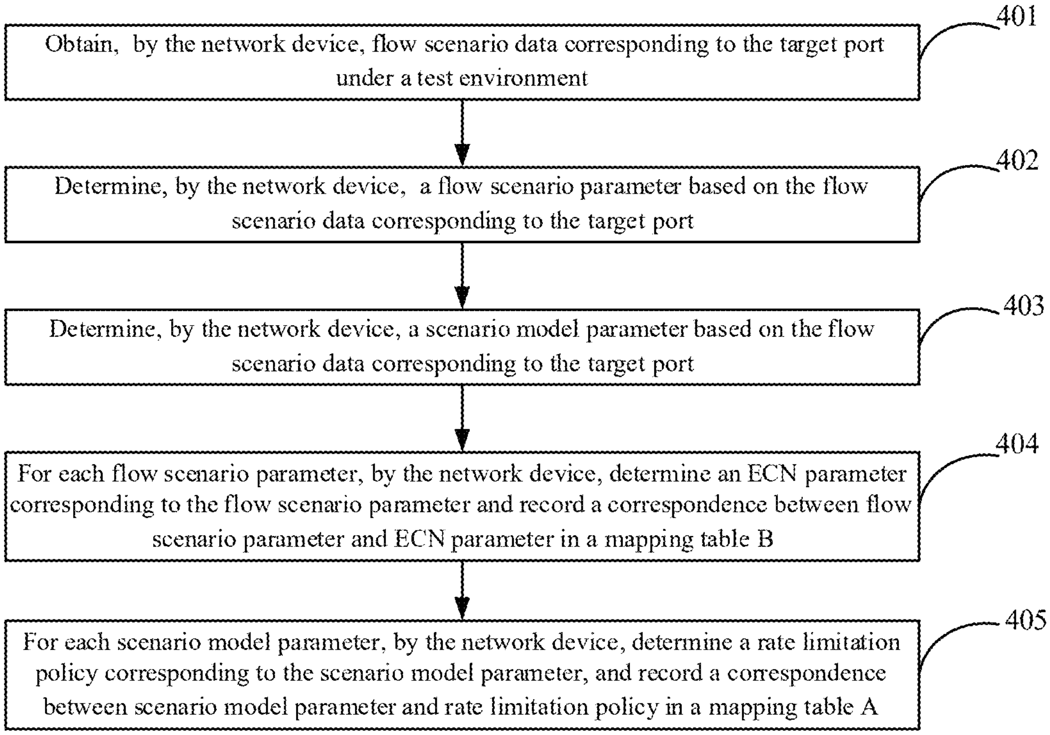
FIG. 4 is a flowchart illustrating a test process according to an embodiment of the present disclosure.

In one possible implementation, FIG. 4 is a flowchart illustrating a test process, as shown in FIG. 4, the test process includes the following steps 401 to 405.

At step 401, the network device obtains flow scenario data corresponding to the target port under a test environment.

Illustratively, if a port of the network device is connected to another device via a long-distance optical fiber, the port is denoted as a target port. In other words, the target port of the network device is connected to another device via a long-distance optical fiber. The long-distance optical fiber is an optical fiber type, which represents the length of the optical fiber is large, for example, the length of the optical fiber is greater than a length threshold.

Illustratively, the target port corresponds to a plurality of priority queues which include a target priority queue for carrying specified-type data. The specified-type data may include but not limited to ROCE data. priority-based flow control (PFC) configuration and ECN configuration and the like are to be enabled for the target priority queue to achieve lossless forwarding.

For example, the target port may correspond to eight priority queues, which are denoted as cost queue, cos 1 queue, cos 2 queue, cos 3 queue, cos 4 queue, cos 5 queue, cos 6 queue and cos 7 queue respectively. The cos 4 queue and/or cos 5 queue may be set to the target priority queue, and the PFC configuration and ECN configuration and the like are enabled for the target priority queue. Of course, another queue may also be set to the target priority queue, which is not limited herein. After the network device receives the specified-type data (e.g., ROCE data), if the network device needs to forward the specified-type data via the target port, the specified-type data may be stored in the target priority queue.

Illustratively, a test environment may be constructed in advance (for example, a test environment is constructed in a laboratory), and the network device obtains flow scenario data corresponding to the target port under the test environment. For example, a test environment 1 may be firstly constructed, and the flow scenario data corresponding to the target port under the test environment 1 is obtained. Then, a test environment 2 is constructed and the flow scenario data corresponding to the target port under the test environment 2 is obtained. Then, a test environment 3 is constructed and the flow scenario data corresponding to the target port under the test environment 3 is obtained and so on.

In this way, a large number of test environments can be constructed, and the flow scenario data under different test environments can be collected. Further, the flow scenario parameter and the scenario model parameter under different test environments can be obtained. The test environments may differ in that: different test environments may correspond to different incasts (used to represent an egress port number corresponding to the specified-type data in the target priority queue, namely, represent the number of ingress ports corresponding to the target port), and in other words, different test environments can be constructed by changing the incast; the ingress port average bandwidths of different test environments may be different, and in other words, different test environments can be constructed by changing the ingress port average bandwidth; different test environments may correspond to different optical fiber lengths of the long-distance optical fiber, and in other words, different test environments can be constructed by changing the optical fiber length of the long-distance optical fiber; different test environments may correspond to different egress port rates, and in other words, different test environments can be constructed by changing the egress port rate of the target port; different test environments may correspond to different ROCE data flow numbers, and in other words, different test environments can be constructed by changing the ROCE data flow number. Of course, the above are only several examples, which is not limited herein. A large number of different test environments can be constructed and the flow scenario data under different test environments can be collected.

For each test environment, in order to obtain the flow scenario data corresponding to the target port under the test environment, the specified-type data (e.g., ROCE data) in the target priority queue may be transmitted by sampling mirroring to a field programmable gate array (FPGA) or a central processing unit (CPU), and then the FPGA or CPU calculates the specified-type data to obtain the flow scenario data corresponding to the target port under the test environment.

For example, the flow scenario data may include but not limited to at least one of: a packet number (the number of packets included in a ROCE data flow) of the ROCE data flow (with the specified-type data as ROCE data, the ROCE data having a same triple forms one ROCE data flow, where the triple may include a source IP, a destination IP, and a destination QP and the like), a packet total length of the ROCE data flow (a total length of all packets of the ROCE data flow), a packet average length of the ROCE data flow (a quotient of the total length of the packets and the number of the packets), a service flow rate of the ROCE data flow, a packet loss number of the ROCE data flow (the number of lost packets in the ROCE data flow), an egress port and an ingress port of the ROCE data flow, virtual extensible local area network (VXLAN) encapsulation information of the ROCE flow data, and an inactive time of the ROCE data flow and the like. When there are several ROCE data flows, the flow scenario data may include a packet number, a packet total length, a packet average length, a service flow rate, a packet loss number, an ingress port and egress port, VXLAN encapsulation information and an inactive time corresponding to each ROCE data flow.

With the target priority queue as unit, ROCE data flow with the target priority queue as egress queue is selected, and aggregation statistics is performed on the above information (e.g., the packet number, the packet total length, the packet average length, the service flow rate, the packet loss number, the ingress port and egress port, the VXLAN encapsulation information and the inactive time) of the ROCE data flow. Thus, the flow scenario data may also include but not limited to at least one of: an average bandwidth corresponding to the target priority queue, an ingress port number corresponding to the target priority queue (the ingress port number may be referred to as Incast used to represent a total number of ingress ports corresponding to all ROCE data flows in the target priority queue, namely, the ingress ports of all ROCE data flows are determined and a total number of the ingress ports is calculated), a data flow number of each ingress port corresponding to the target priority queue (i.e. the number of the ROCE data flows which can be referred to Flow), a big-bandwidth data flow number of each ingress port corresponding to the target priority queue (the number of the ROCE data flows with big bandwidth, where the big bandwidth refers to that the bandwidth is greater than a threshold, and the big-bandwidth data flow number may be referred to as BigFlow), an average bandwidth of each ingress port corresponding to the target priority queue, a ratio of different ROCE data flows corresponding to the target priority queue (e.g., a ratio of the ROCE data of write type, the ROCE data flow of read type, and the ROCE data flow of transmit type), and a round-trip delay (RTT) corresponding to the target priority queue.

On the basis of the flow scenario data (obtained based on the specified-type data in the target priority queue), the flow scenario data of the network device may also be calculated. For example, the flow scenario data may further include but not limited to at least one of a device type of the network device, an optical fiber length of the long-distance optical fiber, and an egress port rate of the target port. The device type of the network device may be, for example, XGS type, June type or Marvel type or the like, which is not limited herein. The optical fiber length of the long-distance optical fiber may be preset to multiple candidate lengths, for example, a positive integer times 10 km, such as 10 km, 20 km and 30 km and the like. When the target port is connected to another device via the long-distance optical fiber, the actual length of the long-distance optical fiber can be calculated, and a candidate length closest to the actual length is selected as the optical fiber length of the long-distance optical fiber from all the candidate lengths. The egress port rate of the target port may be 25 G or 100 G or the like, which is not limited herein.

Of course, the above are only several examples of the flow scenario data, which is not limited herein.

At step 402, the network device determines a flow scenario parameter based on the flow scenario data corresponding to the target port.

Illustratively, for each test environment, after the flow scenario data corresponding to the target port under the test environment is obtained, a flow scenario parameter corresponding to the test environment may be determined based on the flow scenario data, and thus, the flow scenario parameter corresponding to each test environment can be determined. The flow scenario parameter may include but not limited to at least one of: a device type of the network device, an egress port rate of the target port, an ingress port number corresponding to the specified-type data in the target priority queue, and a queue level of the target priority queue. Of course, the above are only several examples of the flow scenario parameter, and the flow scenario parameter may also include other parameters, which is not limited herein.

For the device type of the network device, since the flow scenario data includes the device type of the network device, the device type of the network device can be determined based directly on the flow scenario data. The device type of the network device may be XGS type, June type or Marvel type or the like, which is not limited herein.

For the egress port rate of the target port, since the flow scenario data includes the egress port rate of the target port, the egress port rate of the target port can be determined based directly on the flow scenario data. The egress port rate of the target port may be 25 G, or 100 G or the like, which is not limited herein.

For the ingress port number corresponding to the specified-type data in the target priority queue, since the flow scenario data includes the ingress port number corresponding to the target priority queue, the ingress port number corresponding to the specified-type data in the target priority queue can be determined based directly on the flow scenario data. The ingress port number may be referred to as Incast used to represent the number of input ports corresponding to the target port.

For the queue level of the target priority queue (i.e., queue range value), the queue range value may be determined based on the queue average bandwidth of the target priority queue and the queue average bandwidth of other priority queues than the target priority queue. For example, based on the queue average bandwidth of the target priority queue (determined based on the flow scenario data), the queue average bandwidth of other priority queues than the target priority queue (determined based on the flow scenario data), the egress port rate of the target port (determined based on the flow scenario data), the queue range value may be determined. If the queue average bandwidth of the target priority queue is 10 G, and the queue average bandwidth of other priority queues than the target priority queue is 5 G, and the egress port rate of the target port is 25 G, the queue range value may be 10/(25−5), i.e., 0.5.

In conclusion, the flow scenario parameters such as the device type of the network device, the egress port rate of the target port, the ingress port number, the queue level of the target priority queue and the like may be obtained. The flow scenario parameters are configured to identify a flow scenario of the target port and the flow scenario parameters are formed into parameter vectors (DeviceType, PortSpeed, Incast, Range) used as basis for dividing the scenario models. Thus, different parameter vectors correspond to different scenario models. DeviceType represents the device type of the network device, PortSpeed represents the egress port rate of the target port, Incast represents the ingress port number, and Range represents the queue level of the target priority queue.

At step 403, the network device determines a scenario model parameter based on the flow scenario data corresponding to the target port.

Illustratively, for each test environment, after the flow scenario data corresponding to the target port under the test environment is obtained, the scenario model parameter corresponding to the test environment may be determined based on the flow scenario data, and thus, the scenario model parameter corresponding to each test environment can be determined. The scenario model parameter may include but not limited to at least one of: an optical fiber length of the long-distance optical fiber (the long-distance optical fiber corresponding to the target port), a device type of the network device, an egress port rate of the target port, an ingress port number corresponding to the specified-type data in the target priority queue and a queue level of the target priority queue. Of course, the above are only several examples of the scenario model parameter, and the scenario model parameter may also include other parameters, which is not limited herein.

For the optical fiber length of the long-distance optical fiber, since the flow scenario data includes the optical fiber length corresponding to the long-distance optical fiber, the optical fiber length corresponding to the long-distance optical fiber can be determined based directly on the flow scenario data. For the device type of the network device, since the flow scenario data includes the device type of the network device, the device type of the network device can be determined based directly on the flow scenario data. For the egress port rate of the target port, since the flow scenario data includes the egress port rate of the target port, the egress port rate of the target port can be determined based directly on the flow scenario data. For the ingress port number corresponding to the specified-type data in the target priority queue, since the flow scenario data includes the ingress port number corresponding to the target priority queue, the ingress port number corresponding to the specified-type data in the target priority queue can be determined based directly on the flow scenario data. For the queue level of the target priority queue (queue range value), the queue level can be determined based on the queue average bandwidth of the target priority queue (determined based on the flow scenario data) and the queue average bandwidth of other priority queues than the target priority queue (determined based on the flow scenario data).

In conclusion, the scenario model parameters such as the optical fiber length corresponding to the long-distance optical fiber, the device type of the network device, the egress port rate of the target port, the ingress port number, the queue level of the target priority queue and the like may be obtained. The scenario model parameters are configured to identify a flow scenario of the target port. With the optical fiber length corresponding to the long-distance optical fiber, the device type of the network device, the egress port rate of the target port, and the ingress port number as an example, the scenario model parameters are formed into parameter vectors (DeviceType, PortSpeed, Incast, Dist) used as basis for dividing the scenario models. Thus, different parameter vectors correspond to different scenario models. DeviceType represents the device type of the network device, PortSpeed represents the egress port rate of the target port, Incast represents the ingress port number, and Dist represents the optical fiber length corresponding to the long-distance optical fiber, which may be a positive integer times 10 km.

At step 404, for each flow scenario parameter, the network device determines an ECN parameter corresponding to the flow scenario parameter and records a correspondence between flow scenario parameter and ECN parameter in a mapping table B.

For each test environment, after the flow scenario parameter corresponding to the test environment is obtained, an ECN parameter corresponding to the flow scenario parameter may be determined under the test environment. Thus, for a flow scenario (a flow scenario under the test environment), a proper ECN parameter is selected, where the selection manner of the ECN parameter is not limited herein as long as the ECN parameter can enable the flow of the target priority queue to satisfy the good performance index (the performance index of the data transmission performance, for example, the queue average bandwidth of the target priority queue, and the round-trip delay corresponding to the target priority queue and the like). As a result, in the flow scenario corresponding to the flow scenario parameter, the ECN parameter can enable the flow of the target priority queue to satisfy the good performance index.

After the ECN parameter corresponding to the flow scenario parameter is obtained, the correspondence between the flow scenario parameter and the ECN parameter may be recorded in the mapping table B. As shown in FIG. 1, it is an example of the mapping table B.

TABLE 1

| Flow scenario parameter | ECN parameter |
|---|---|
| Flow scenario parameter a1 | ECN parameter b1 |
| Flow scenario parameter a2 | ECN parameter b2 |
| . . . | . . . |

At step 405, for each scenario model parameter, the network device determines a rate limitation policy corresponding to the scenario model parameter, and records a correspondence between scenario model parameter and rate limitation policy in a mapping table A.

For each test environment, the scenario model parameter corresponding to the test environment is obtained, a rate limitation policy corresponding to the scenario model parameter may be determined under the test environment. Thus, for a flow scenario (a flow scenario under the test environment), a proper rate limitation policy is selected. The selection manner of the rate limitation policy is not limited herein as long as the rate limitation policy can enable the flow of the target priority queue to satisfy the good performance index (i.e., the performance index of the data transmission performance, for example, the queue average bandwidth of the target priority queue, the round-trip delay corresponding to the target priority queue and the like). Therefore, in the flow scenario corresponding to the scenario model parameter, the rate limitation policy can enable the flow of the target priority queue to satisfy the good performance index.

Illustratively, for each scenario model parameter (the scenario model parameter corresponding to each test environment), with one scenario model parameter as an example, step 405 can be performed in the following steps.

At step 4051, a plurality of rate limitation policies corresponding to the scenario model parameter are obtained. For example, a plurality of rate limitation policies may be pre-configured and used as the rate limitation policies corresponding to the scenario model parameter.

At step 4052, the ECN parameter is enabled for the target port, that is, the ECN parameter is valid.

Illustratively, when a rate limitation policy corresponding to a scenario model parameter corresponding to a test environment is determined, the rate limitation policy is determined under the test environment. Since the ECN parameter corresponding to the flow scenario parameter corresponding to the test environment is already known, the ECN parameter can be enabled for the target port as shown in step 404.

Illustratively, after the ECN parameter is enabled for the target port, when the specified-type data (e.g., the ROCE data) in the target priority queue corresponding to the target port is sent, a congestion mark may be added to the specified-type data based on the ECN parameter. The specified-type data added with the congestion mark is configured to allow the destination device to transmit CNPs to the source device. In other words, after the destination device receives the specified-type data added with the congestion mark, the destination device may transmit the CNPs to the source device. For the process of adding the congestion mark to the specified-type data based on the ECN parameter, the ECN parameter may include but not limited to a base water mark, a high water mark and a mark probability. If the queue length of the target priority queue is greater than the base water mark but not greater than the high water mark, the congestion mark is added to the specified-type data based on the mark probability; if the queue length of the target priority queue is greater than the high water mark, the congestion mark is added to the data of all specified types in the target priority queue. Of course, the above is only an example of adding the congestion mark to the specified-type data, and the addition manner of the congestion mark is not limited in this embodiment.

At step 4053, for each rate limitation policy, rate limitation is performed on the CNPs received by the target port based on the rate limitation policy, and the data transmission performance corresponding to the target port after rate limitation is calculated.

Illustratively, after the ECN parameter is enabled for the target port, the network device may receive the CNPs via the target port (the CNPs transmitted by the destination device to the source device). Thus, rate limitation may be performed on the CNPs received by the target port based on the rate limitation policy. The rate limitation policy may include but not limited to a rate limitation value for the CNPs, which refers to a byte number of the CNPs permitted to run through per second, or a packet number of the CNPs permitted to run through per second.

Illustratively, after rate limitation is performed on the CNPs received by the target port based on the rate limitation policy, the network device may calculate the data transmission performance corresponding to the target port after rate limitation. For example, the queue average bandwidth corresponding to the target priority queue and the round-trip delay corresponding to the specified-type data in the target priority queue may be calculated and based on the queue average bandwidth and/or the round-trip delay, the data transmission performance corresponding to the target port after rate limitation is determined. For example, based on the queue average bandwidth and the round-trip delay, the data transmission performance corresponding to the target port after rate limitation may be determined. The data transmission performance is in direct proportion with the queue average bandwidth, and the data transmission performance is in inverse proportion with the round-trip delay.

The queue average bandwidth may be a Throughput performance index. After rate limitation is performed on the CNPs received by the target port, the queue average bandwidth corresponding to the target priority queue may be calculated.

The round-trip delay may be a latency performance index. After rate limitation is performed on the CNPs received by the target port, the round-trip delay corresponding to the specified-type data in the target priority queue may be calculated. For example, a transmitting moment and a reception moment respectively corresponding to the specified-type data may be determined, namely, the transmitting moment and the reception moment corresponding to a same piece of data are determined. The transmitting moment refers to a transmitting moment of the network device for the specified-type data, and the reception moment refers to a reception moment of the network device for response data of the specified-type data. Based on a difference between the reception moment and the transmitting moment, the round-trip delay may be determined.

After the queue average bandwidth and the round-trip delay are obtained, the data transmission performance corresponding to the target port may be determined based on the queue average bandwidth and the round-trip delay. For example, the queue average bandwidth and the round-trip delay are normalized to a same value level and then subjected to weighted operation to obtain the data transmission performance. A weight coefficient corresponding to the queue average bandwidth may be equal to or greater than or less than a weight coefficient corresponding to the round-trip delay. Of course, the above is only an example, and no limitation is made herein.

When the data transmission performance corresponding to the target port is determined based on the queue average bandwidth and the round-trip delay, the data transmission performance is in direct proportion with the queue average bandwidth, namely, the larger the queue average bandwidth is, the better the data transmission performance is, and the smaller the queue average bandwidth is, the poorer the data transmission performance is. Further, the data transmission performance is in inverse proportion with the round-trip delay, namely, the larger the round-trip delay is, the poorer the data transmission performance is, and the smaller the round-trip delay is, the better the data transmission performance is.

In conclusion, for each rate limitation policy, after rate limitation is performed on the CNPs received by the target port based on the rate limitation policy, the data transmission performance corresponding to the rate limitation policy may be obtained.

At step 4054, based on the data transmission performance corresponding to each rate limitation policy, a rate limitation policy corresponding to an optimal data transmission performance (i.e., maximum data transmission performance) is selected from all rate limitation policies.

At step 4055, a correspondence between scenario model parameter and rate limitation policy corresponding to the optimal data transmission performance is recorded in the mapping table A. For example, after the rate limitation policy corresponding to the optimal data transmission performance is obtained, the rate limitation policy is used as a rate limitation policy matching the scenario model parameter, and the correspondence between the scenario model parameter and the rate limitation policy is recorded in the mapping table A. As shown in Table 2, it is an example of the mapping table A.

TABLE 2

| Scenario model parameter | Rate limitation policy |
|---|---|
| Scenario model parameter c1 | Rate limitation policy d1 |
| Scenario model parameter c2 | Rate limitation policy d2 |
| . . . | . . . |

Obviously, since the rate limitation policy is a rate limitation policy corresponding to the optimal data transmission performance, in the flow scenario corresponding to the scenario model parameter, the rate limitation policy can enable the flow of the target priority queue to satisfy good performance index, for example, the Throughput performance index and the Latency performance index.

Illustratively, since rate limitation is performed on the CNPs received by the target port, the above rate limitation process may also be that a CNP-based CAR policy is distributed for an inbound direction of the target port, where the CAR policy is a rate limitation policy. When rate limitation is performed on the CNPs of the target port, the rate limitation can enable the CNPs transmitted by the destination device to be smooth, greatly increasing the Throughput performance of the system.

The rate limitation policy may be a rate limitation value for the CNPs, which may be pps representing a byte number of the CNPs permitted to run through per second, or may be Bps representing a packet number of the CNPs permitted to run through per second.

Thus, the test process is completed and the mapping table A and the mapping table B are obtained. The mapping table A includes the correspondence between scenario model parameter and the rate limitation policy and the mapping table B includes the correspondence between flow scenario parameter and ECN parameter.

Figure 5:
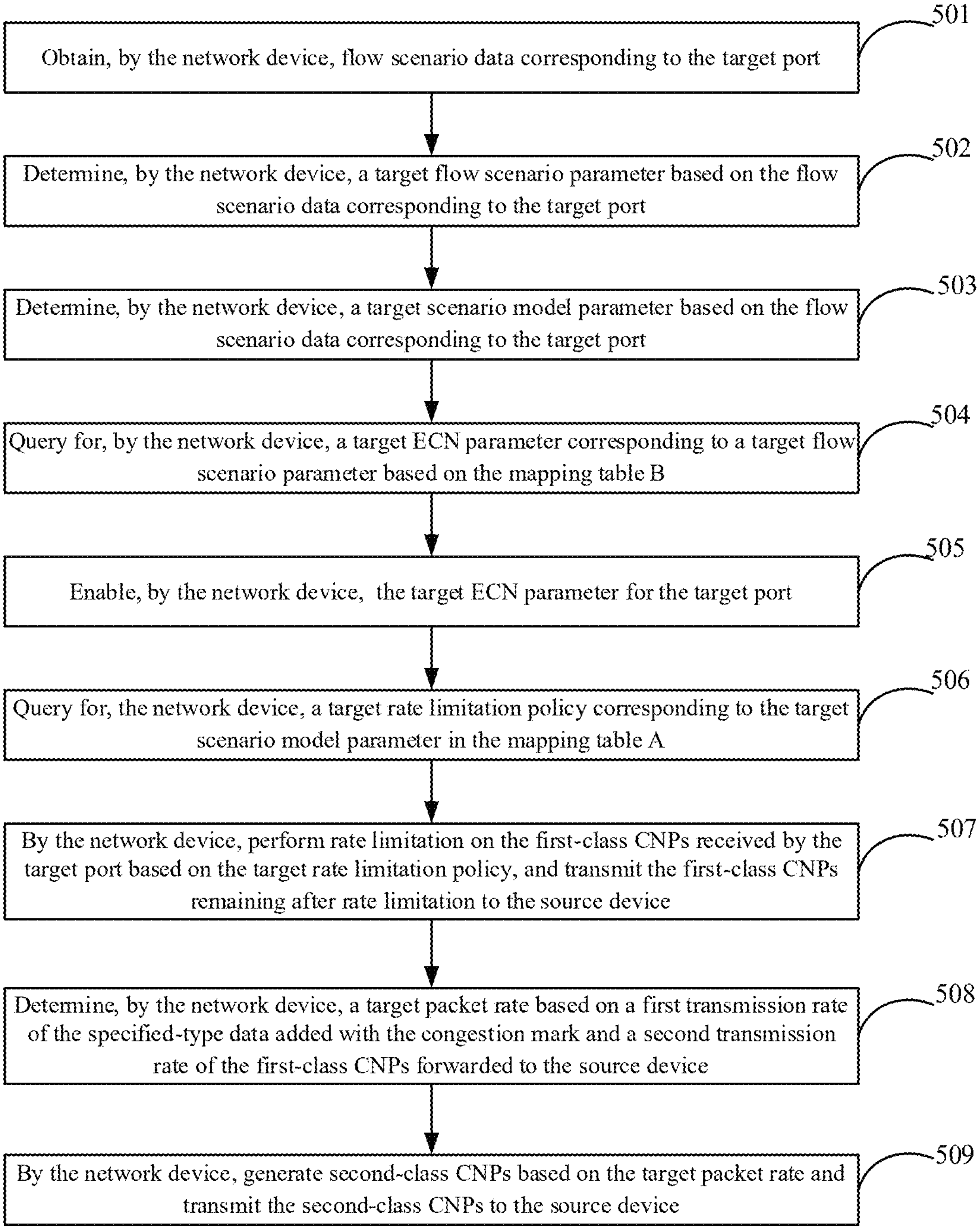
FIG. 5 is a flowchart illustrating an application process according to an embodiment of the present disclosure.

In one possible implementation, FIG. 5 is a flowchart illustrating an application process, as shown in FIG. 5, the application process includes the following steps 501 to 509.

At step 501, the network device obtains flow scenario data corresponding to the target port.

Illustratively, the target port of the network device is connected to another device via a long-distance optical fiber, where the optical fiber length of the long-distance optical fiber is greater than a length threshold. The target port corresponds to a plurality of priority queues which include a target priority queue for carrying specified-type data. The specified-type data is ROCE data.

Illustratively, during an actual operation of the network device, the network device may obtain the flow scenario data corresponding to the target port, for example, the network device may obtain the flow scenario data corresponding to the target port periodically. Each time the flow scenario data is obtained, packet transmission can be achieved by using subsequent steps.

The manner of obtaining the flow scenario data may be referred to the step 401 and will not be repeated herein.

At step 502, the network device determines a target flow scenario parameter based on the flow scenario data corresponding to the target port. Illustratively, after the flow scenario data corresponding to the target port is obtained, the target flow scenario parameter may be determined based on the flow scenario data. The target flow scenario parameter may include but not limited to at least one of: a device type of the network device, an egress port rate of the target port, a number of ingress ports corresponding to the specified-type data in the target priority queue, and a queue level of the target priority queue. For example, the target flow scenario parameter is configured to identify a flow scenario of the target port, and the target flow scenario parameters are formed into parameter vectors (DeviceType, PortSpeed, Incast, Range) used as basis for dividing scenario models.

At step 503, the network device determines a target scenario model parameter based on the flow scenario data corresponding to the target port. Illustratively, after the flow scenario data corresponding to the target port is obtained, the target scenario model parameter may be determined based on the flow scenario data. The target scenario model parameter may include but not limited to at least one of: an optical fiber length of the long-distance optical fiber (the long-distance optical fiber corresponding to the target port), a device type of the network device, an egress port rate of the target port, a number of ingress ports corresponding to the specified-type data in the target priority queue, and a queue level of the target priority queue. For example, the scenario model parameters are formed into parameter vectors (DeviceType, PortSpeed, Incast, Dist) used as basis for dividing scenario models.

At step 504, the network device queries for a target ECN parameter corresponding to a target flow scenario parameter based on the mapping table B. For example, since the mapping table B includes the correspondence between flow scenario parameter and ECN parameter as shown in Table 1, after the target flow scenario parameter is obtained, the mapping table B may be queried based on the target flow scenario parameter to obtain the target ECN parameter corresponding to the target flow scenario parameter.

At step 505, the network device enables the target ECN parameter for the target port, that is, the target ECN parameter is valid.

Illustratively, after the ECN parameter is enabled for the target port, when the network device transmits to the destination device the specified-type data (e.g., the ROCE data) in the target priority queue corresponding to the target port, the network device may add a congestion mark to the specified-type data based on the ECN parameter. The congestion mark is configured to allow the destination device to transmit first-class CNPs to the source device, that is, after receiving the specified-type data added with the congestion mark, the destination device may transmit the first-class CNPs to the source device.

For the process of adding the congestion mark to the specified-type data based on the target ECN parameter, the target ECN parameter may include but not limited to: a target base water mark, a target high water mark, and a target mark probability. In this case, if the queue length of the target priority queue is greater than the target base water mark but not greater than the target high water mark, the congestion mark may be added to the specified-type data based on the target mark probability; if the queue length of the target priority queue is greater than the target high water mark, the congestion mark may be added to the data of all specified types in the target priority queue. Of course, the above is only an example of adding the congestion mark to the specified-type data, and the addition manner of the congestion mark is not limited in the present embodiment.

At step 506, the network device queries for a target rate limitation policy corresponding to the target scenario model parameter in the mapping table A. Illustratively, the mapping table A includes the correspondence between scenario model parameter and rate limitation policy, and the rate limitation policy is configured to allow the target port to have an optimal data transmission performance under the scenario model parameter as shown in Table 2. Therefore, after the target scenario model parameter is obtained, the mapping table A may be queried based on the target scenario model parameter to obtain the target rate limitation policy corresponding to the target scenario model parameter.

Of course, the target rate limitation policy may also be obtained another way. For example, a rate limitation policy may be configured as the target rate limitation policy based on experiences. No limitation is made to the manner of obtaining the target rate limitation policy.

At step 507, the network device performs rate limitation on the first-class CNPs received by the target port based on the target rate limitation policy, and transmits the first-class CNPs remaining after rate limitation to the source device. The first-class CNPs are configured to control the source device to lower the transmission rate of the specified-type data.

Illustratively, in order to enable the target ECN parameter for the target port, the network device may receive the first-class CNPs via the target port and based on the target rate limitation policy, perform rate limitation on the first-class CNPs received by the target port. The target rate limitation policy may include but not limited to a rate limitation value for the first-class CNPs, where the rate limitation value represents a byte number of the first-class CNPs permitted to run through per second or a packet number of the first-class CNPs permitted to run through per second.

With the packet number of the first-class CNPs permitted to run through per second as an example, if the network device receives 100 first-class CNPs via the target port per second and the target rate limitation policy is 40, the network device will filter out 60 first-class CNPs and transmit the remaining 40 first-class CNPs to the source device.

In conclusion, it can be seen that, in this embodiment, by identifying a scenario change, the ECN parameter and the rate limitation policy (CAR parameter) may be dynamically adjusted, that is, the network device can obtain the flow scenario data corresponding to the target port periodically. Each time the flow scenario data is obtained, the ECN parameter and the rate limitation policy can be dynamically adjusted, such that the flow of target priority queue corresponding to the target port can reach good performance index.

For example, in an actual operation of the network device, the flow scenario data is continuously collected and based on these flow scenario data, a scenario change is identified and thus a proper ECN parameter and a proper rate limitation policy can be selected for distribution to the network device. In this way, the change of the flow scenario can be smartly detected and identified and the influence of the long-distance optical fiber can be minimized by adjusting the ECN parameter and the rate limitation policy.

At step 508, the network device determines a target packet rate based on a first transmission rate of the specified-type data added with the congestion mark and a second transmission rate of the first-class CNPs forwarded to the source device.

Illustratively, a first amount of the specified-type data added with the congestion mark within a target period of time may be calculated and based on the first amount and a time length of the target period of time, the first transmission rate is determined, where the first transmission rate may also be referred to as ECN_marked_rate (ECN marked rate). For example, when the network device needs to transmit supplementary CNPs, a plurality of periods of time for transmitting supplementary CNPs may be set and denoted as target periods of time. The time length of the target period of time may be set to, for example, 1 ms or 2 ms or the like based on experiences. When the network device transmits the specified-type data to the destination device, the congestion mark may be added to the specified-type data based on the target ECN parameter, and the first amount of the specified-type data added with the congestion mark within the target period of time can be calculated. After the first amount is obtained, ECN_marked_rate may be determined based on a quotient value of the first amount and the time length of the target period of time, for example, the quotient value is taken as ECN_marked_rate.

Illustratively, a second amount of the first-class CNPs forwarded to the source device within the target period of time may be calculated, and based on the second amount and the time length of the target period of time, the second transmission rate is determined, where the second transmission rate may also be referred to as CNP_green_rate (green CNP rate). For example, after the network device performs rate limitation on the first-class CNPs received by the target port based on the target rate limitation policy, the first-class CNPs remaining after rate limitation are referred to as green CNPs and the first-class CNPs filtered out are not referred to as green CNPs. In this case, the network device can calculate the second amount of the first-class CNPs forwarded to the source device (i.e., the number of the green CNPs) within the target period of time, and thus based on the quotient value of the second amount and the time length of the target period of time, CNP_green_rate is determined, for example, the quotient value is determined as CNP_green_rate.

Illustratively, after ECN_marked_rate and CNP_green_rate are obtained, the target packet rate may be determined based on ECN_marked_rate and CNP_green_rate. For example, the target packet rate Cpu_Ipcc_rate may be determined in the following formula: Cpu_Ipcc_rate=ECN_marked_rate-min (ECN_marked_rate, CNP_green_rate). In the above formula, min (ECN_marked_rate, CNP_green_rate) refers to a candidate packet rate, where the candidate packet rate may be a minimum value of ECN_marked_rate and CNP_green_rate. Based on the above formula, the target packet rate Cpu_Ipcc_rate can be determined based on a difference between ECN_marked_rate and the candidate packet rate.

ECN_marked_rate represents a transmission rate of the specified-type data added with the congestion mark and can be used to approximately represent the rate CNP_server_rate of the first-class CNPs transmitted by the destination device. Thus, ECN_marked_rate in the above formula can be replaced with CNP_server_rate.

At step 509, the network device generates second-class CNPs (for ease of differentiation, the CNPs generated by the network device are referred to as second-class CNPs) based on the target packet rate and transmits the second-class CNPs to the source device, where the second-class CNPs are configured to control the source device to lower the transmission rate of the specified-type data.

Illustratively, the network device may obtain the first transmission rate and the second transmission rate periodically, and then determine the target packet rate, and based on the target packet rate, transmit the second-class CNPs to the source device. For example, for each target period of time, the target packet rate is determined, and then based on the target packet rate, the second-class CNPs are transmitted to the source device within the target period of time. For example, the target period of time may be 1 ms and the target packet rate represents a number of the second-class CNPs to be transmitted within 1 ms.

Illustratively, the network device generates a target number of second-class CNPs matching the target packet rate. For example, the target number is determined based on a product of the target packet rate and the time length of the target period of time, for example, the product is determined as the target number and then the target number of the second-class CNPs are generated.

Illustratively, the target priority queue includes a data flow corresponding to at least one source device. With the specified-type data as ROCE data, the ROCE data with a same triple forms one ROCE data flow and each data flow corresponds to one source device. Thus, for each source device, based on a rate of the data flow corresponding to the source device, a rate ratio corresponding to the source device may be determined, and based on the target number and the rate ratio corresponding to the source device, the packet number corresponding to the source device may be determined.

For example, it is assumed that the target priority queue includes a data flow a1, a data flow a2 and a data flow a3, where the rate of the data flow a1 is 100/ms (representing 100 pieces of ROCE data are received per ms within the target period of time), the rate of the data flow a2 is 200/ms, and the rate of the data flow a3 is 300/ms. In this case, the rate ratio corresponding to the source device b1 corresponding to the data flow a1 is 1/6, the rate ratio corresponding to the source device b2 corresponding to the data flow a2 is 2/6, and the rate ratio corresponding to the source device b3 corresponding to the data flow a3 is 3/6. On the above basis, the packet number corresponding to the source device b1 may be the target number*1/6, the packet number corresponding to the source device b2 may be the target number*2/6, and the packet number corresponding to the source device b3 may be the target number*3/6.

Illustratively, for each source device, after the packet number corresponding to the source device is obtained, the network device may transmit the packet number of second-class CNPs to the source device. In conclusion, it can be seen from the above that the larger the rate of the data flow (bandwidth) is, the more second-class CNPs are transmitted to the source device.

Illustratively, in order to increase the transmission rate of the second-class CNPs, the second-class CNPs may be transmitted to the source device by data plane development kit (DPDK). The DPDK bypasses the processing procedure of the Linux core protocol stack for the data packets and achieves one data plane in the user space to perform data packet reception and transmission, which significantly increases the data processing performance and throughput, and improves the working efficiency of the data plane application program. Therefore, the second-class CNPs can be transmitted to the source device by DPDK. Alternatively, the second-class CNPs may be transmitted to the source device by FPGA. A CNP template is constructed in advance in the FPGA, and the CPU notifies the FPGA of the to-be-sent CNP parameter (e.g., the address of the source device and the like) and the transmitting number, and then the FPGA transmits the second-class CNPs to the source device.

In conclusion, the network device may transmit supplementary second-class CNPs to the source device, such that the source device can lower the transmission rate of the specified-type data in time, which not only solves the problem of long congestion feedback path but also accurately controls the number of the transmitted CNPs. Therefore, timely rate reduction during congestion can be achieved and excessive rate reduction upon mitigation of the congestion can be avoided. The network device actively transmits the second-class CNPs to replace the back pressure effect of the ECN, so as to avoid the signal delay influence introduced by the long-distance link.

It can be seen from the above technical solutions that, in the embodiments of the present disclosure, in a long-distance optical fiber scenario, rate limitation may be performed on the CNPs received by the target port to avoid a large number of CNPs received by the source device within a short period of time. Thus, the CNPs received by the source device are relatively balanced and smooth, and the rate reduction process of the source device (the process of lowering the data transmission rate) is smoother and hence the case that the source device lowers the rate greatly within a period of time but lowers the rate little or does not lower the rate at all within another period of time can be avoided. In this case, the network device has good data transmission performance, and thus the case that the network device receives a large amount of data within a period of time, leading to network congestion, but receives a small amount of data within another period of time, leading to failure to fully use the bandwidth resource, can be avoided. Further, based on the target rate limitation policy corresponding to the target scenario model parameter (i.e., the actual scenario model parameter) of the network device, rate limitation is performed on the CNPs received by the target port. The target rate limitation policy matches the actual scenario of the network device such that the target rate limitation policy has better rate limitation effect. Furthermore, the target scenario model parameter at least includes the optical fiber length of the long-distance optical fiber, such that the target rate limitation policy is related to the optical fiber length, namely, the target rate limitation policy best matching the optical fiber length can be found so as to further improve the forwarding performance of the target port, thus maximizing the data transmission performance of the network device. An embodiment of the present disclosure further provides an implementation solution of optimizing the forwarding performance of the long-distance port by the rate limitation policy. A CNP-based rate limitation policy is distributed for an inbound direction of the long-distance port (the target port) to perform rate limitation on the CNPs of the target port, so as to make the CNPs transmitted by the destination device smoother, thereby improving the Throughput performance of the system. The ECN parameter and the rate limitation policy are combined to minimize the influence of the long-distance port and ensure the flow of the target priority queue of the target port satisfies the good performance index. This solution can be applied to various network scenarios and solve the problem of the lower forwarding performance resulting from the network delay in long-distance optical fiber scenario of the data center. Furthermore, based on the transmission rate of the specified-type data added with the congestion mark and the transmission rate of the first-class CNPs forwarded to the source device, the target packet rate can be determined, and then, the second-class CNPs can be generated based on the target packet rate, and transmitted to the source device. In this way, the network device can transmit supplementary CNPs to further mitigate the influence of the long-distance optical fiber, and thus better control the transmission rate of the source device for the specified-type data, achieving better control effect. The ECN parameter, the rate limitation policy and the supplementary CNP transmitting process can be organically combined and the ECN parameter helps to obtain better forwarding performance, and the rate limitation policy achieves smoothing and back pressure effect. The ECN parameter and the rate limitation policy greatly reduce the number of the supplementary CNPs to be sent, and the supplementary CNP transmitting process further mitigates the influence of the long-distance link. This solution has the advantages of simple implementation, small CPU load, good test effect and applicability to various network scenarios and the like. Therefore, the actual good effect can be achieved in this solution. For example, in along-distance environment of 60 km, the flow can be increased to 92 G from 52 G, greatly increasing the Throughput performance.

Figure 6:
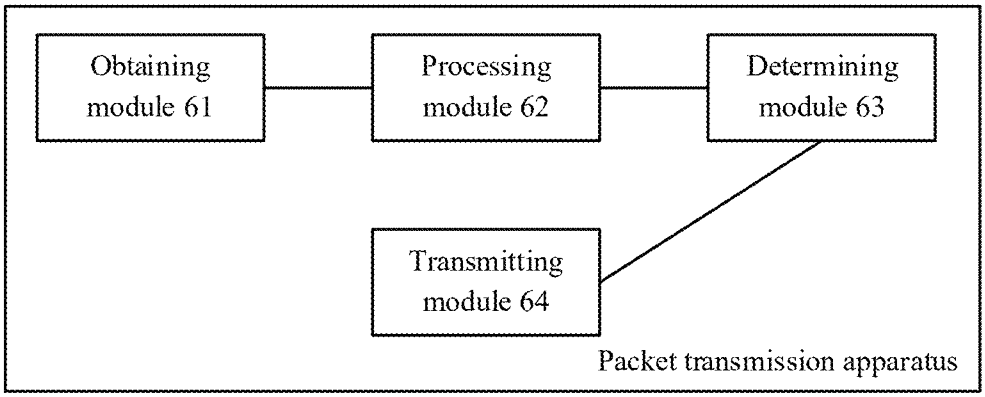
FIG. 6 is a structural schematic diagram illustrating a packet transmission apparatus according to an embodiment of the present disclosure.

Based on the same application idea as the above method, an embodiment of the present disclosure provides a packet transmission apparatus, which is applied to a network device. The network device includes a target port. The target port is connected to another device via a long-distance optical fiber. FIG. 6 is a structural schematic diagram of the apparatus. As shown in FIG. 6, the apparatus includes: an obtaining module 61, a processing module 62, a determining module 63, and a transmitting module 64.

The obtaining module 61 is configured to obtain a target rate limitation policy and a target explicit congestion notification (ECN) parameter corresponding to the target port.

The processing module 62 is configured to, when transmitting specified-type data in a target priority queue corresponding to the target port to a destination device, add a congestion mark to the specified-type data based on the target ECN parameter, where the congestion mark is configured to allow the destination device to transmit first-class congestion notification packets (CNPs) to a source device.

Where the processing module 62 is further configured to, based on the target rate limitation policy, perform rate limitation on the first-class CNPs received by the target port, and transmit the first-class CNPs remaining after rate limitation to the source device.

The determining module 63 is configured to, based on a first transmission rate of the specified-type data added with the congestion mark and a second transmission rate of the first-class CNPs forwarded to the source device, determine a target packet rate. The transmitting module 64 is configured to, based on the target packet rate, generate second-class CNPs, and transmit the second-class CNPs to the source device, where the second-class CNPs are configured to control the source device to lower the transmission rate of the specified-type data.

Illustratively, when based on the first transmission rate of the specified-type data added with the congestion mark and the second transmission rate of the first-class CNPs forwarded to the source device, determining the target packet rate, the determining module 63 is specifically configured to: calculate a first amount of the specified-type data added with the congestion mark within a target period of time, and calculate a second amount of the first-class CNPs forwarded to the source device within the target period of time; based on the first amount and a time length of the target period of time, determine the first transmission rate; based on the second amount and the time length of the target period of time, determine the second transmission rate; based on the first transmission rate and the second transmission rate, determine the target packet rate.

Illustratively, when based on the first transmission rate of the specified-type data added with the congestion mark and the second transmission rate of the first-class CNPs forwarded to the source device, determining the target packet rate, the determining module 63 is specifically configured to: based on the first transmission rate and the second transmission rate, determine a candidate packet rate, where the candidate packet rate is a minimum value in the first transmission rate and the second transmission rate; based on a difference between the first transmission rate and the candidate packet rate, determine the target packet rate.

Illustratively, when based on the target packet rate, generating the second-class CNPs, and transmitting the second-class CNPs to the source device, the transmitting module 64 is specifically configured to: generate a target number of second-class CNPs matching the target packet rate; if the target priority queue comprises a data flow corresponding to at least one source device, for each source device, based on a rate of the data flow corresponding to the source device, determine a rate ratio corresponding to the source device; based on the target number and the rate ratio corresponding to the source device, determine a packet number corresponding to the source device, and transmit the packet number of second-class CNPs to the source device.

Illustratively, when obtaining the target rate limitation policy corresponding to the target port, the obtaining module 61 is specifically configured to: based on flow scenario data corresponding to the target port, determine a target scenario model parameter, where the target scenario model parameter at least includes an optical fiber length corresponding to the long-distance optical fiber; based on a mapping table, query for a target rate limitation policy corresponding to the target scenario model parameter (the target rate limitation policy corresponding to the target port); where the mapping table includes a correspondence between scenario model parameter and rate limitation policy, and the rate limitation policy is configured to allow the target port to have an optimal data transmission performance under the scenario model parameter.

Illustratively, before based on the mapping table, querying for the target rate limitation policy corresponding to the target scenario model parameter, the obtaining module 61 is further configured to: based on flow scenario data corresponding to the target port under a test environment, determine a scenario model parameter, and obtain a plurality of rate limitation policies corresponding to the scenario model parameter; for each rate limitation policy, based on the rate limitation policy, perform rate limitation on the CNPs received by the target port and calculate the data transmission performance corresponding to the target port after rate limitation; based on the data transmission performance corresponding to each rate limitation policy, record in the mapping table a correspondence between the scenario model parameter and the rate limitation policy corresponding to the optimal data transmission performance so as to establish the mapping table.

Illustratively, the target ECN parameter includes a target base water mark, a target high water mark and a target mark probability, and when based on the target ECN parameter, adding the congestion mark to the specified-type data, the processing module 62 is specifically configured to: if a queue length of the target priority queue is greater than the target base water mark but not greater than the target high water mark, add the congestion mark to the specified-type data based on the target mark probability; if the queue length of the target priority queue is greater than the target high water mark, add the congestion mark to the data of all specified types in the target priority queue.

Figure 7:
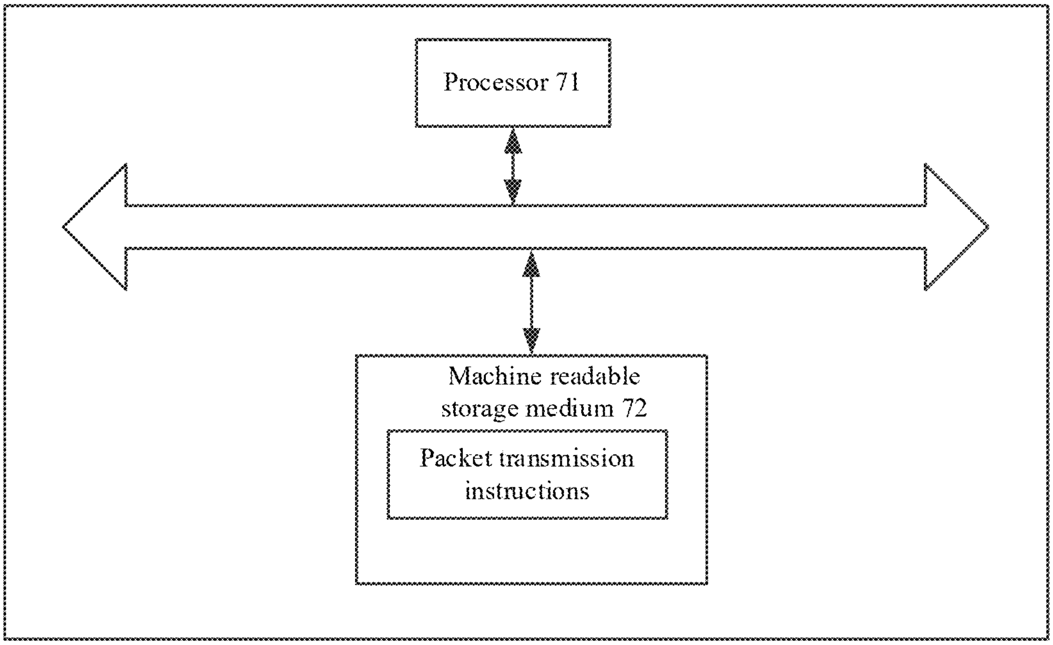
FIG. 7 is a hardware structural diagram illustrating a network device according to an embodiment of the present disclosure.

Based on the same application idea as the above method, an embodiment of the present disclosure provides a network device. As shown in FIG. 7, the network device includes: a processor 71 and a machine readable storage medium 72, where the machine readable storage medium 72 stores machine executable instructions executable by the processor 71; and the processor 71 is configured to execute the machine executable instructions to perform the packet transmission method mentioned in the above embodiments.

Based on the same application idea as the above method, an embodiment of the present disclosure provides a machine readable storage medium, storing several computer instructions, where the computer instructions are executed by a processor to perform the packet transmission method mentioned in the above embodiments.

The machine readable storage medium mentioned herein may be any of electronic, magnetic, optical or other physical storage devices and may contain or store information such as executable instructions, data and so on. For example, the machine readable storage medium may be a Radom Access Memory (RAM), a volatile or non-volatile, a flash memory, a storage drive (e.g., hard disk drive), a solid state hard disk, any type of storage disk (e.g., compact disk, Digital Video Disk (DVD)), or a similar storage medium, or a combination thereof.

The systems, apparatuses, modules or units described in the above examples may be specifically implemented by a computer entity or may be implemented by a product with a particular function. A typical implementing device may be a computer and the computer may be specifically a personal computer, a laptop computer, a cellular phone, a camera phone, a smart phone, a personal digital assistant, a media player, a navigation device, an email transceiver, a game console, a tablet computer, a wearable device, or a combination of any several devices of the above devices.

For ease of descriptions, the above apparatus is divided into different units based on functionality for descriptions. Of course, the functions of different units may be implemented in a same or a plurality of hardware and/or software when practicing the present disclosure.

The persons skilled in the art should understand that the embodiments of the present disclosure may be provided as a method, a system, or a computer program product. Thus, entire hardware embodiments, entire software embodiments or embodiments combining software and hardware may be adopted in the present disclosure. Further, the present disclosure may be implemented in the form of a computer program product that is operated on one or more computer available storage media (including but not limited to magnetic disk memory, CD-ROM, and optical memory and so on) including computer available program codes.

The present disclosure is described by referring to flowcharts and/or block diagrams of a method, a device (a system) and a computer program product in the embodiments of the present disclosure. It is understood that each flowchart and/or block in the flowcharts and/or the block diagrams or a combination of a flow chart and/or a block of the flowcharts and/or the block diagrams may be implemented by computer program instructions. These computer program instructions may be provided to a general-purpose computer, a dedicated computer, an embedded processor, or a processor of another programmable data processing device to generate a machine so that the instructions executable by a computer or a processor of another programmable data processing device generate an apparatus for implementing functions designated in one or more flows of the flowcharts and/or one or more blocks of the block diagrams.

Further, these computer program instructions may also be stored in a computer readable memory that can direct a computer or another programmable data processing device to work in a particular manner so that the instructions stored in the computer readable memory generate a product including an instruction apparatus and the instruction apparatus can implement functions designated in one or more flows of the flowcharts and/or one or more blocks of the block diagrams.

The computer program instructions may also be loaded on a computer or another programmable data processing device, so that a series of operation steps can be executed on the computer or another programmable device to generate processing achieved by the computer, and thus instructions executable on the computer or another programmable device are provided for steps for realizing functions designated in one or more flows of the flowcharts and/or one or more blocks of the block diagrams.

The above descriptions are only some embodiments of the present disclosure, and are not intended to limit the present disclosure. For those skilled in the art, the present disclosure may have various changes and modifications. Any modifications, equivalent replacements, improvements, etc. made within the spirit and principle of this present disclosure shall fall within the scope of claims of the present disclosure.

The invention claimed is:

1. A packet transmission method, applied to a network device comprising a target port connected to another device via a long-distance optical fiber, and comprising:

obtaining a target rate limitation policy and a target explicit congestion notification (ECN) parameter corresponding to the target port;

when transmitting specified-type data in a target priority queue corresponding to the target port to a destination device, adding a congestion mark to the specified-type data based on the target ECN parameter, wherein the congestion mark is configured to allow the destination device to transmit first-class congestion notification packets (CNPs) to a source device;

based on the target rate limitation policy, performing rate limitation on the first-class CNPs received by the target port, and transmitting the first-class CNPs remaining after rate limitation to the source device;

based on a first transmission rate of the specified-type data added with the congestion mark and a second transmission rate of the first-class CNPs forwarded to the source device, determining a target packet rate; and based on the target packet rate, generating second-class CNPs, and transmitting the second-class CNPs to the source device, wherein the second-class CNPs are configured to control the source device to lower a transmission rate of the specified-type data.

2. The method of claim 1, wherein based on the first transmission rate of the specified-type data added with the congestion mark and the second transmission rate of the first-class CNPs forwarded to the source device, determining the target packet rate comprises:

calculating a first amount of the specified-type data added with the congestion mark within a target period of time, and calculating a second amount of the first-class CNPs forwarded to the source device within the target period of time;

based on the first amount and a time length of the target period of time, determining the first transmission rate;

based on the second amount and the time length of the target period of time, determining the second transmission rate; and based on the first transmission rate and the second transmission rate, determining the target packet rate.

3. The method of claim 1, wherein based on the first transmission rate of the specified-type data added with the congestion mark and the second transmission rate of the first-class CNPs forwarded to the source device, determining the target packet rate comprises:

based on the first transmission rate and the second transmission rate, determining a candidate packet rate, wherein the candidate packet rate is a minimum value in the first transmission rate and the second transmission rate; and based on a difference between the first transmission rate and the candidate packet rate, determining the target packet rate.

4. The method of claim 1, wherein based on the target packet rate, generating the second-class CNPs, and transmitting the second-class CNPs to the source device comprise:

generating a target number of second-class CNPs matching the target packet rate;

when the target priority queue comprises a data flow corresponding to at least one source device, for each source device, based on a rate of the data flow corresponding to the source device, determining a rate ratio corresponding to the source device; and based on the target number and the rate ratio corresponding to the source device, determining a packet number corresponding to the source device, and transmitting the packet number of second-class CNPs to the source device.

5. The method of claim 1, wherein obtaining the target rate limitation policy corresponding to the target port comprises:

based on flow scenario data corresponding to the target port, determining a target scenario model parameter, wherein the target scenario model parameter at least comprises an optical fiber length corresponding to the long-distance optical fiber; and based on a mapping table, querying for a target rate limitation policy corresponding to the target scenario model parameter;

wherein the mapping table comprises a correspondence between scenario model parameter and rate limitation policy, and the rate limitation policy is configured to allow the target port to have an optimal data transmission performance under the scenario model parameter.

6. The method of claim 5, further comprising, before based on the mapping table, querying for the target rate limitation policy corresponding to the target scenario model parameter:

based on flow scenario data corresponding to the target port under a test environment, determining a scenario model parameter, and obtaining a plurality of rate limitation policies corresponding to the scenario model parameter;

for each rate limitation policy, based on the rate limitation policy, performing rate limitation on CNPs received by the target port and calculating the data transmission performance corresponding to the target port after rate limitation; and based on the data transmission performance corresponding to each rate limitation policy, recording in the mapping table a correspondence between the scenario model parameter and the rate limitation policy corresponding to the optimal data transmission performance.

7. The method of claim 1, wherein the target ECN parameter comprises a target base water mark, a target high water mark and a target mark probability, and based on the target ECN parameter, adding the congestion mark to the specified-type data comprises:

when a queue length of the target priority queue is greater than the target base water mark, but is not greater than the target high water mark, adding the congestion mark to the specified-type data based on the target mark probability;

when the queue length of the target priority queue is greater than the target high water mark, adding the congestion mark to the data of all specified types in the target priority queue.

8. A network device, comprising:

a processor; and a non-transitory machine readable storage medium storing machine executable instructions executable by the processor, wherein the processor is configured to, when executing the machine executable instructions, perform operations comprising:

obtaining a target rate limitation policy and a target explicit congestion notification (ECN) parameter corresponding to the target port;

when transmitting specified-type data in a target priority queue corresponding to the target port to a destination device, adding a congestion mark to the specified-type data based on the target ECN parameter, wherein the congestion mark is configured to allow the destination device to transmit first-class congestion notification packets (CNPs) to a source device;

based on the target rate limitation policy, performing rate limitation on the first-class CNPs received by the target port, and transmitting the first-class CNPs remaining after rate limitation to the source device;

based on a first transmission rate of the specified-type data added with the congestion mark and a second transmission rate of the first-class CNPs forwarded to the source device, determining a target packet rate; and based on the target packet rate, generating second-class CNPs, and transmitting the second-class CNPs to the source device, wherein the second-class CNPs are configured to control the source device to lower a transmission rate of the specified-type data.

9. The network device of claim 8, wherein based on the first transmission rate of the specified-type data added with the congestion mark and the second transmission rate of the first-class CNPs forwarded to the source device, determining the target packet rate comprises:

calculating a first amount of the specified-type data added with the congestion mark within a target period of time, and calculating a second amount of the first-class CNPs forwarded to the source device within the target period of time;

based on the first amount and a time length of the target period of time, determining the first transmission rate;

based on the second amount and the time length of the target period of time, determining the second transmission rate; and based on the first transmission rate and the second transmission rate, determining the target packet rate.

10. The network device of claim 8, wherein based on the first transmission rate of the specified-type data added with the congestion mark and the second transmission rate of the first-class CNPs forwarded to the source device, determining the target packet rate comprises:

based on the first transmission rate and the second transmission rate, determining a candidate packet rate, wherein the candidate packet rate is a minimum value in the first transmission rate and the second transmission rate; and based on a difference between the first transmission rate and the candidate packet rate, determining the target packet rate.

11. The network device of claim 8, wherein based on the target packet rate, generating the second-class CNPs, and transmitting the second-class CNPs to the source device comprise:

generating a target number of second-class CNPs matching the target packet rate;

when the target priority queue comprises a data flow corresponding to at least one source device, for each source device, based on a rate of the data flow corresponding to the source device, determining a rate ratio corresponding to the source device; and based on the target number and the rate ratio corresponding to the source device, determining a packet number corresponding to the source device, and transmitting the packet number of second-class CNPs to the source device.

12. The network device of claim 8, wherein obtaining the target rate limitation policy corresponding to the target port comprises:

based on flow scenario data corresponding to the target port, determining a target scenario model parameter, wherein the target scenario model parameter at least comprises an optical fiber length corresponding to the long-distance optical fiber; and based on a mapping table, querying for a target rate limitation policy corresponding to the target scenario model parameter;

wherein the mapping table comprises a correspondence between scenario model parameter and rate limitation policy, and the rate limitation policy is configured to allow the target port to have an optimal data transmission performance under the scenario model parameter.

13. The network device of claim 12, further comprising, before based on the mapping table, querying for the target rate limitation policy corresponding to the target scenario model parameter:

based on flow scenario data corresponding to the target port under a test environment, determining a scenario model parameter, and obtaining a plurality of rate limitation policies corresponding to the scenario model parameter;

for each rate limitation policy, based on the rate limitation policy, performing rate limitation on CNPs received by the target port and calculating the data transmission performance corresponding to the target port after rate limitation; and based on the data transmission performance corresponding to each rate limitation policy, recording in the mapping table a correspondence between the scenario model parameter and the rate limitation policy corresponding to the optimal data transmission performance.

14. The network device of claim 8, wherein the target ECN parameter comprises a target base water mark, a target high water mark and a target mark probability, and based on the target ECN parameter, adding the congestion mark to the specified-type data comprises:

when a queue length of the target priority queue is greater than the target base water mark, but is not greater than the target high water mark, adding the congestion mark to the specified-type data based on the target mark probability;

when the queue length of the target priority queue is greater than the target high water mark, adding the congestion mark to the data of all specified types in the target priority queue.

* * * * *